Jan. 13, 1931.  A. BERAUD ET AL  1,788,976
FLOW METER
Filed May 18, 1927
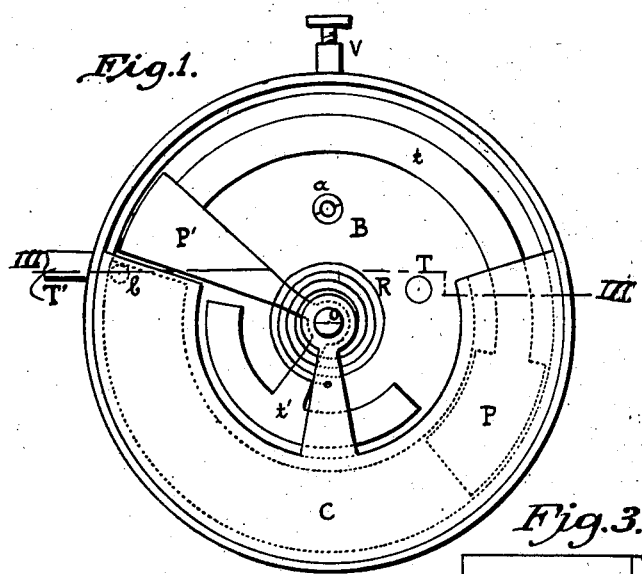
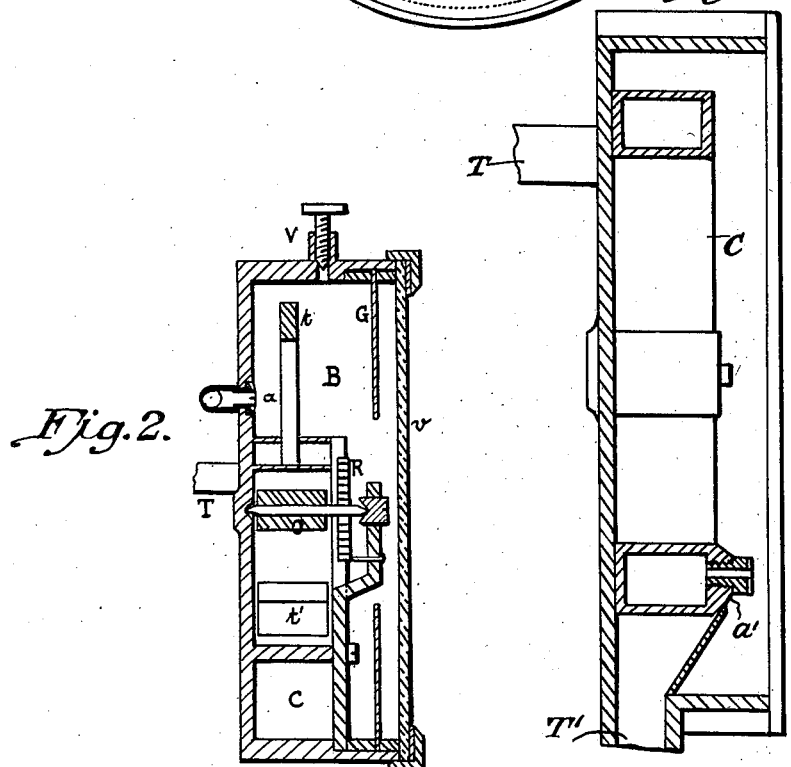
INVENTORS
ARMAND BERAUD
GAETAN JACQUET
BY
ATTORNEY Patented Jan. 13, 1931

1,788,976

UNITED STATES PATENT OFFICE

ARMAND BERAUD AND GAËTAN JACQUET, OF LA ROCHELLE, FRANCE

FLOW METER

Application filed May 18, 1927, Serial No. 192,344, and in France May 27, 1926.

This invention relates to devices for measuring the instantaneous rate of flow of a liquid circulating in a conduit, such as for example, the apparatus disclosed in the French Patent #596,337 filed January 29, 1925.

In devices of this type, the liquid is passed through a cylinder provided with a piston, there being an annular space between the piston and the cylinder wall. If the output of liquid be sufficiently small, there will be no appreciable dynamic action on the piston, and the resistance encountered by the liquid in its passage through the cylinder is utilized for determining the output. This resistance is directly proportional to the length of the piston and inversely proportional to the annular section traversed.

As the resistance is due to the viscosity of the liquid, it will be apparent that these devices may be used for measuring viscosities.

In devices heretofore used, the piston is suspended in the cylinder and the inevitable friction between the cylinder and piston seriously affects the accuracy of the instrument. Further, the piston must be balanced by the liquid in the cylinder, which compensation is a very delicate operation, and if the density of the liquid should vary, the final readings of the instrument will be inaccurate. In order to increase the sensitiveness of the instrument, the length of the cylinder has been increased, but this results in a very bulky and cumbersome apparatus.

It is the object of this invention to improve instruments of this type and avoid the various objections to their use.

A further object is to provide a device of the type described which will be strong, substantial, capable of being manufactured by mass production, and still have the required sensitiveness.

Another object of the invention is to provide means for varying the sensitiveness of the instrument.

To accomplish these objects we preferably mount a semi-circular torus-shaped cylinder in a cylindrical housing, thus permitting the use of a large throw of piston to secure the requisite sensitiveness. The housing is provided with a common axis for all the movable parts therein, the connection between the axis and the piston being sufficiently strong to avoid any friction between the piston and the cylinder. The piston and piston rod are balanced by suitable means so that the center of gravity of the mass and the center of the thrust of the immersed volume are located on the said axis of rotation.

In this manner, the force applied and the difference between the weight of the movable parts and the thrust of the liquid are balanced by the reaction of the supports of the axis of rotation, and the density or weight of the liquid has no effect. The improved apparatus, therefore, can be set up in any position without affecting its operation.

Further objects and the means for effecting these objects will be seen from a consideration of the following description.

So that the nature of our invention may be clearly understood, reference is to be had to the drawings forming part of this specification, in which like parts are designated by the same reference characters.

In the drawings, Figure 1 is a front view of the device, the glass cover plate having been removed, while Figure 2 is a vertical section taken through the axis of the device, shown in Figure 1. Figure 3 is a section of the device on the line III—III of Figure 1 showing a modified form of the by-passing means.

C is the semi-circular cylinder, P the piston, P' the body for balancing the piston, $t$ the piston rod, and $t'$ the mass for balancing the rod. The movable equipment therefore comprises the parts P, P', $t$, $t'$, and turns around the axis O situated in the centre of the housing B. This latter, hermetic in type, is closed by the thick glass plate $v$ which enables the dial G to be seen. The coil spring R is co-axial with and has one end thereof attached to axis O while the other end of said coil spring R is attached to the stationary support for axis O or other suitable stationary member. Coil spring R continually tends to actuate the movable members in a direction which is opposed to the liquid and tends to move piston P toward the open end of cylinder C. Whereas, ab is the branch off pipe by means of which a variation can be effected in the sensitiveness by screwing upon one of its extremities a gauged nozzle a. Said gauge nozzle a consists of a threaded flat-headed bolt having a slot in said head and a longitudinal hole through the bolt, this nozzle may be readily replaced by other nozzles having a bore which depends upon the range to be covered by the device. By means of this branch off pipe and its gauged nozzle, a measured small quantity of liquid can be led around the cylinder and piston so that it will not affect the piston. The nozzle a may also be screwed direct at a' into the outer wall of the pipe T', see Figure 3; any external branch pipe thus becomes unnecessary.

The liquid arrives through the tube T, completely fills the housing B, the air in which has been able to escape through the index screw V, penetrates into the cylinder C which it also fills and escapes through the pipe T'.

It will clearly be seen from this example that the housing and the cylinder, except the movable wall may be obtained by stamping or moulding. The movable equipment may be moulded of any plastic material, or moulded from aluminium. This plastic material is cheap, light, is not attacked by spirit, alcohol, benzole, etc., it is strong and does not lose its shape. The apparatus is readily adapted to standardization for purposes of quantity production. Its mounting is very simple. The test or trial will consist in determining that, for a given output, the needle deviates to indicate the known rate of flow. If there should be a slight difference although this is very improbable, it could be corrected very quickly by changing the gauged nozzle. Due to the novel shape and construction of the instrument, a long cylinder is obtained, thus permitting a large throw of the piston and great sensitiveness in the device, without the instrument becoming bulky or cumbersome. All friction between the piston and cylinder is avoided because of the substantial construction and connection between the piston and the axis of the apparatus situated in the center of the housing.

Such an apparatus is perfectly suitable for measuring the rate of flow of fuel to an explosion motor. It is light and easily handled. It is not affected by inclinations. It may be placed upon a motor car or an aircraft. According to this invention, by interchange of gauge nozzles having different bores the device may be changed to have a full scale reading of 6, 12 or 25 liters per hour and thereby be adaptable for use in motor vehicles and small aircraft. Also by the use of gauge nozzles having a still larger bore a device having a full scale reading of 25, 60 or 120 liters per hour is obtained which is adaptable for use in medium and large size aircraft.

If the apparatus is to be mounted higher than the receptacle which feeds the motor, use may be made of a siphon and, for starting the siphon, the vacuum created by the suction of the motor may be employed. A tap should then close the suction orifice when the starting has been effected.

The apparatus can also be mounted as a branch between two points of the main conduit. In order to insure that the piston will not be subjected to great forces which might result in an excessive speed of the liquid, it is well to calculate the maximum quantity of liquid passing through the cylinder in such a manner that the forces exerted on the piston do not exceed the equivalent of 1 gram. The loss of head necessary in the working will therefore be at the most from 1 to 1.5 cm. of spirit. Experience has shown that then there is no reason to fear vibrations, shocks, or jerks, and the low loss in head introduced in the apparatus always permits of placing it between the reservoir or the accumulator and the carburetor of the motor.

The damping is perfect, and the aperiodicity, remains complete even for intermittent flow taking place at a very slow cadence (1 to 2 pulsations per second for example).

What we claim and desire to secure by Letters Patent of the United States is:—

1. In a flow meter, a casing having an orifice for connection with a fluid conduit, a semi-toroidal cylinder fixed in said casing, said cylinder opening into said casing at one end and having a conduit connection at its other end, a solid piston loosely slidably fitting said cylinder, means associated with a fixed point in the center of the semi-tore for guided movement of said piston in said cylinder but out of contact therewith, spring means urging said piston toward the open end of the cylinder, and means controlled by said piston for indicating its position within the cylinder.

2. In a flow meter a casing having an orifice for connection with a fluid conduit, a semi-toroidal cylinder fixed in said casing, said cylinder opening into said casing at one end and having a conduit connection at its other end, a solid piston loosely slidably fitting said cylinder, means mounting said piston at the center of the semi-tore for guided movement in said cylinder but out of contact therewith, said means including an arcuate piston rod, means counterbalancing said piston and rod about the tore-axis, spring means urging said piston toward the open end of the cylinder, and means controlled by said piston for indicating its position within the cylinder.

3. In a flow meter, a casing having an orifice for connection with a fluid conduit, a semi-toroidal cylinder fixed in said casing, said cylinder opening into said casing at one end and having a conduit connection at its other end, a solid piston loosely slidably fitting said cylinder, means pivotally mounted about an axis fixed in the center of the semi-tore and associated with an arcuate rod guiding the piston in said cylinder but out of contact therewith, means counterbalancing said piston and rod about the tore-axis, spring means urging said piston toward the open end of the cylinder, a pipe branching off between the inlet and the outlet fluid conduit, means for regulating the cross section of said pipe comprising a gauged nozzle screwed into said piping, and means controlled by said piston for indicating its position within the cylinder.

4. In a flow meter, a casing having an orifice for connection with a fluid conduit, a semi-toroidal cylinder fixed in said casing, said cylinder opening into said casing at one end and having a conduit connection at its other end, a solid piston loosely slidably fitting said cylinder, means pivotally mounted about an axis fixed in the center of the semi-tore and connected to an arcuate rod carrying the piston and lodged along the axis of said cylinder, means counterbalancing said piston and rod about the tore-axis, spring means urging said piston toward the open end of the cylinder, a gauged nozzle for regulating the rate of flow traversing the cylinder with respect to the flow in the fluid conduit, said nozzle being screwed into a wall separating the volume of the cylinder from the space traversed by the fluid which enters from the conduit but does not flow through the cylinder, and means controlled by said piston for indicating its position within the cylinder.

5. In a flow meter, a casing having an orifice for connection with a fluid conduit, a semi-toroidal cylinder fixed in said casing, said cylinder opening into said casing at one end and having a conduit connection at its other end, a solid piston loosely slidably fitting said cylinder, means pivotally mounted about an axis fixed in the center of the semi-tore and connected to an arcuate rod carrying the piston and lodged along the axis of said cylinder, an indicator pivotally mounted about said semi-tore axis and associated with means guiding the piston in the cylinder, a dial lodged in the casing for reading the indicator positions, a glass plate covering the casing to permit inspection of the dial, means counterbalancing said piston and rod about the tore-axis, spring means urging said piston toward the open end of the cylinder, means for regulating the rate of flow traversing the cylinder with respect to the flow in the fluid conduit, and a screw with pointer screwed into the casing for the purpose of air escapement.

ARMAND BERAUD.
GAËTAN JACQUET.